Sept. 10, 1974 W. P. STRUMBOS 3,834,962
REINFORCED FOAMED-PANEL STRUCTURE
Filed Feb. 18, 1972 4 Sheets-Sheet 1
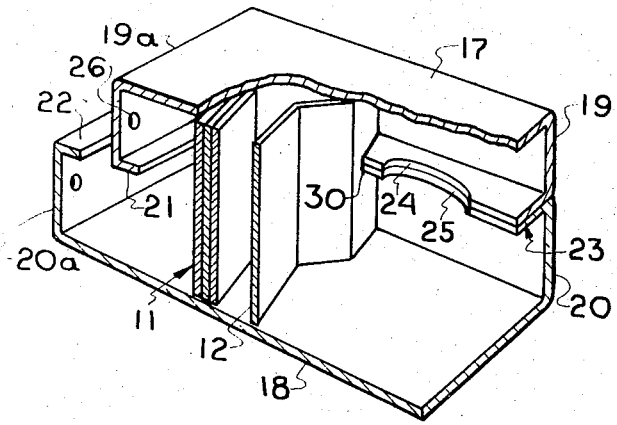
FIG. 1
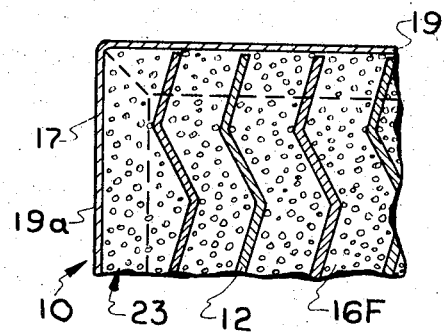
FIG. 7
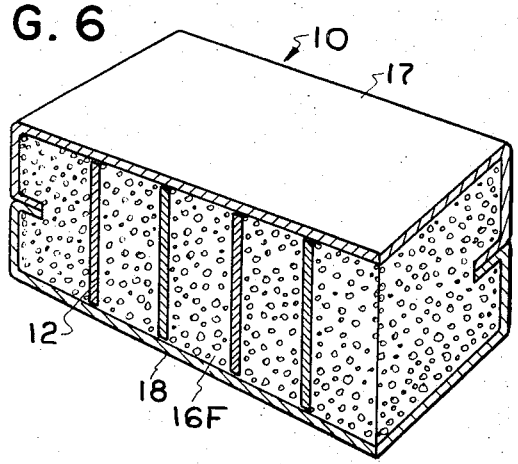
FIG. 6
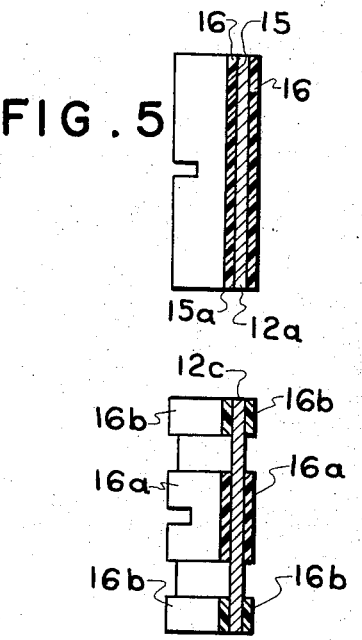
FIG. 5
FIG. 8
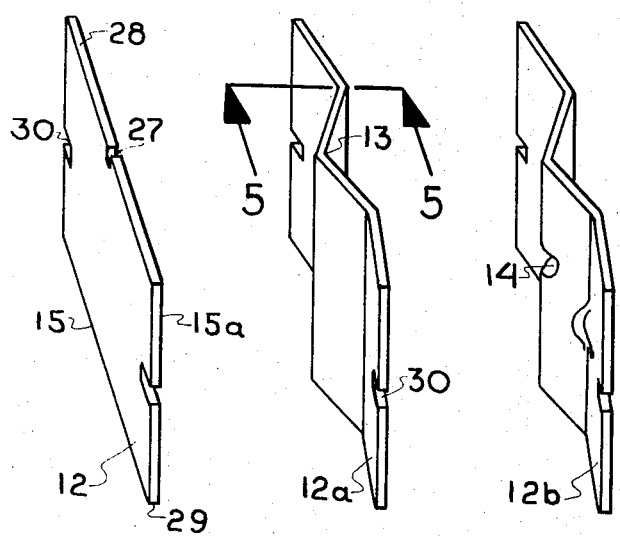
FIG. 2   FIG. 3   FIG. 4

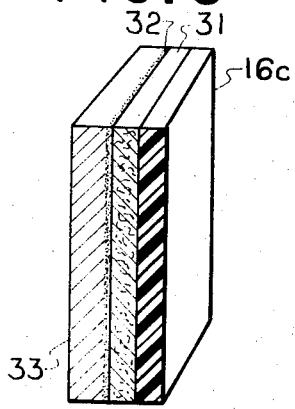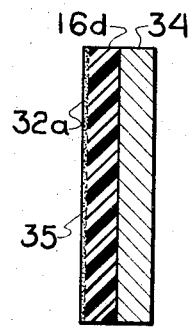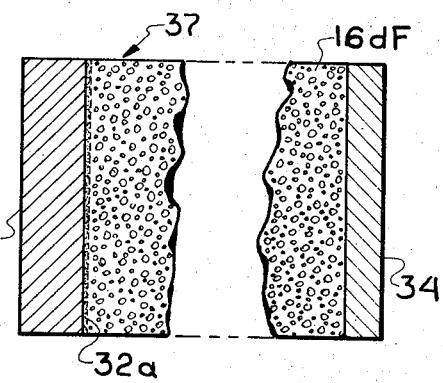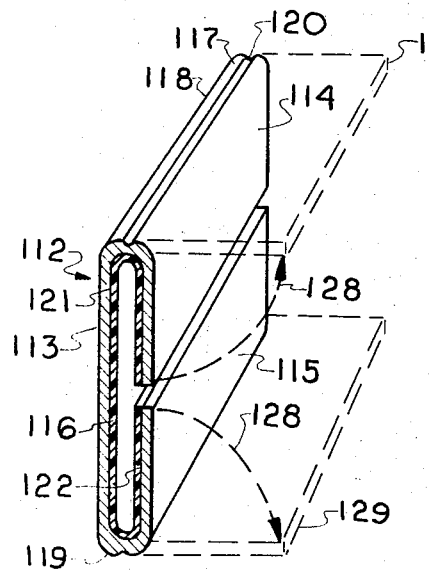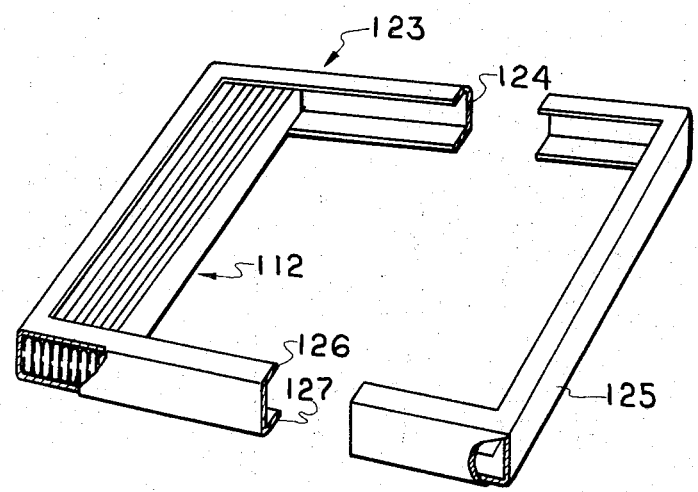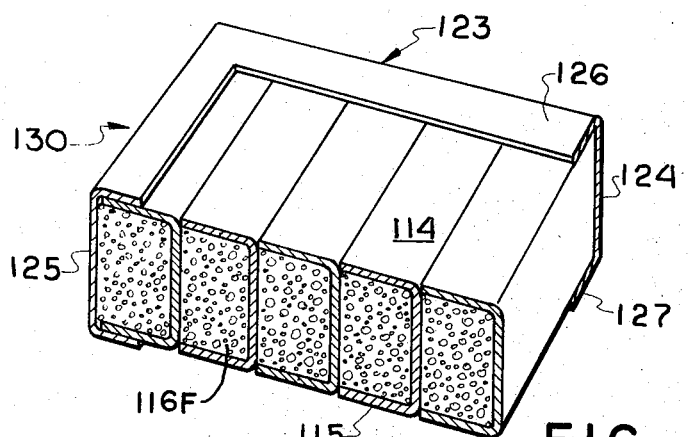

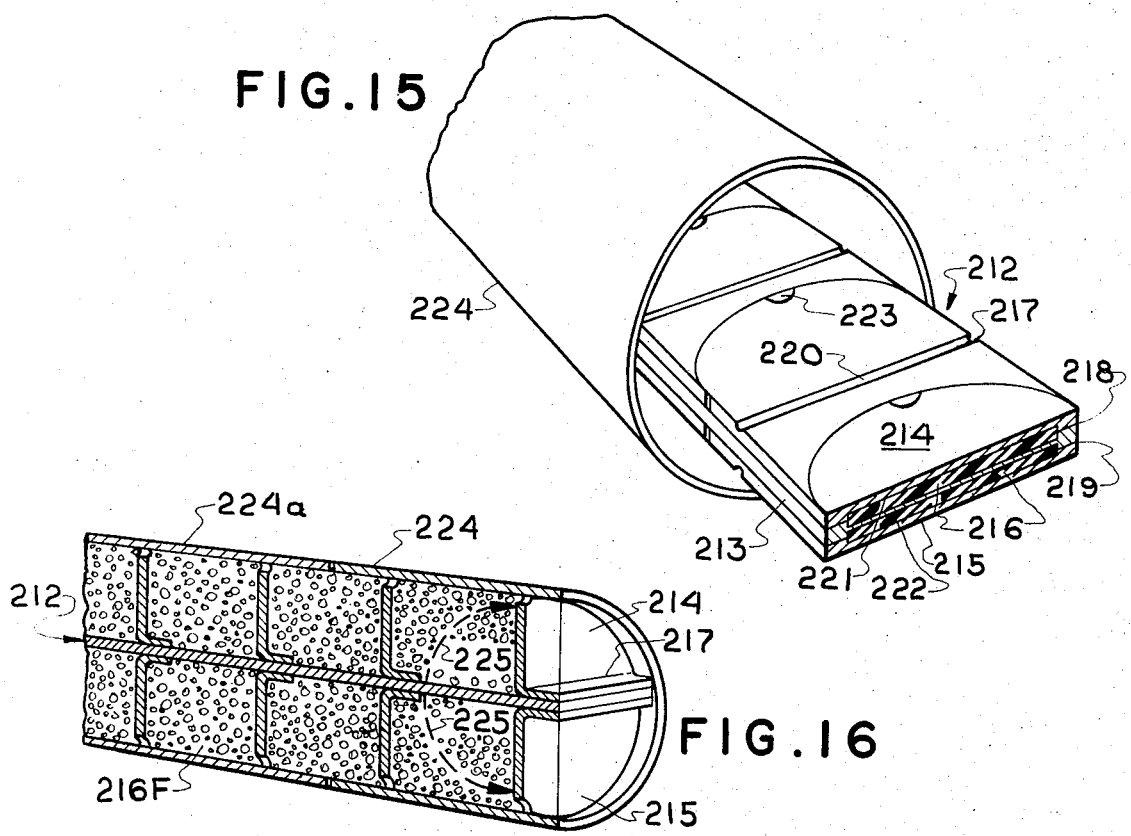
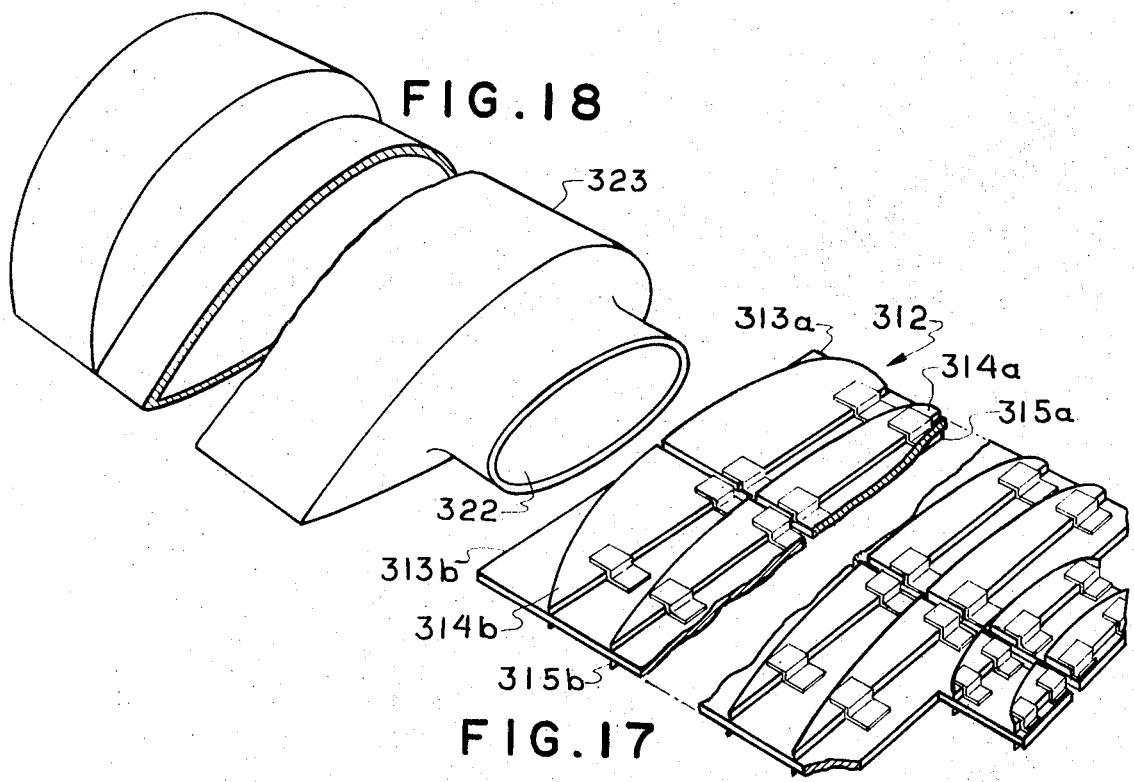

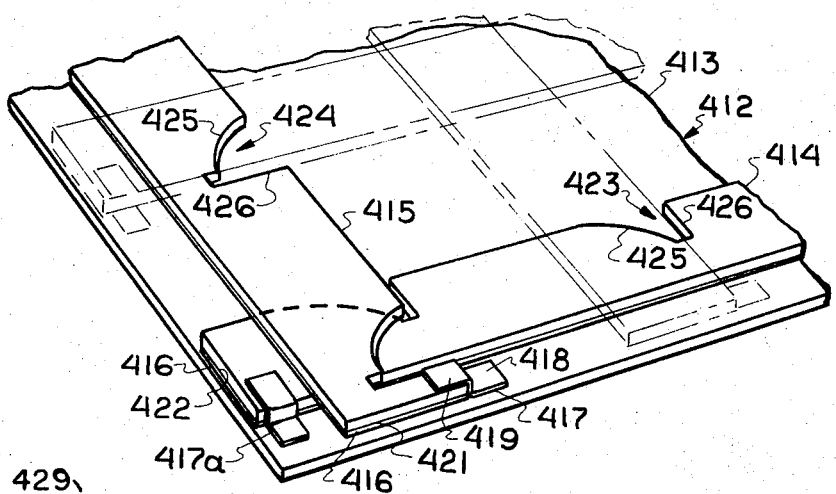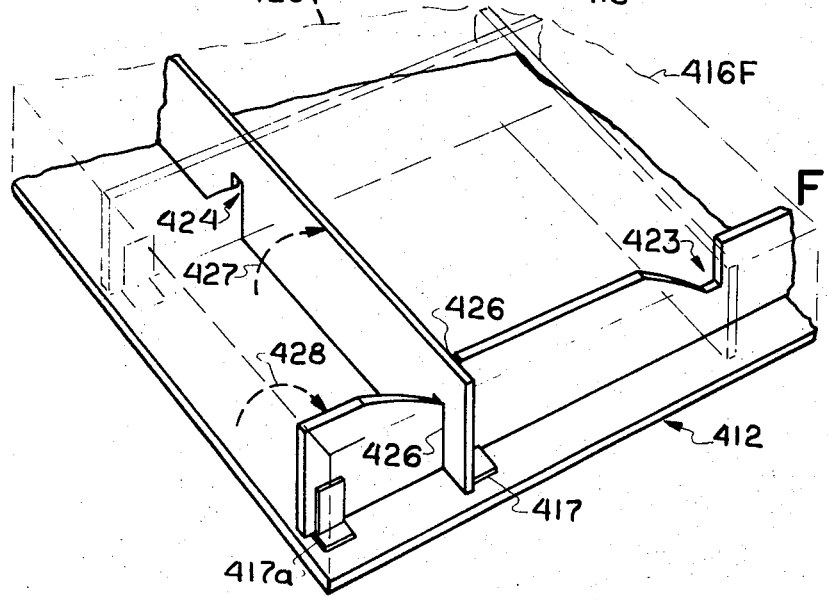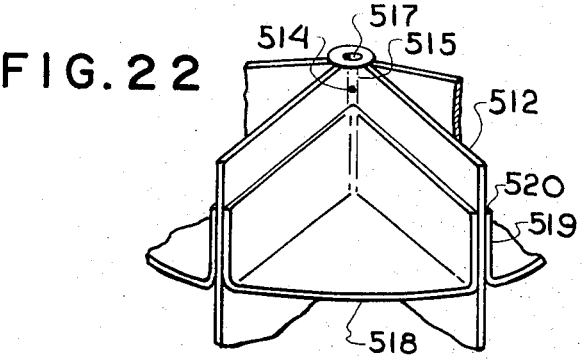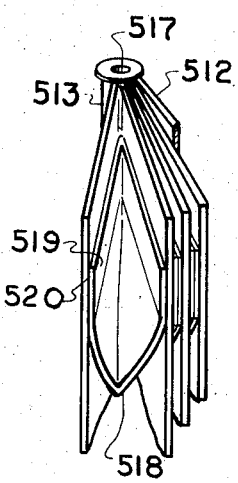

United States Patent Office
3,834,962
Patented Sept. 10, 1974

3,834,962
REINFORCED FOAMED-PANEL STRUCTURE
William P. Strumbos, 85 Middleville Road,
Northport, N.Y. 11768
Filed Feb. 18, 1972, Ser. No. 227,397
The portion of the term of the patent subsequent to
Feb. 22, 1989, has been disclaimed
Int. Cl. B32b 31/06, 31/12
U.S. Cl. 156—79                                    8 Claims

ABSTRACT OF THE DISCLOSURE

In the art of constructing reinforced foamed-panel structures, a method for treating the reinforcing elements of the panel structure during the manufacturing process with a self-contained force-generating foamable substance such that the elements can be shipped in an unexpanded state and a panel can be produced subsequently when required by activating the foamable substance. The force-generating substance is a stable, but potentially reactive, foamable material coated on selected portions of the reinforcing elements with the foamable reactants of the material isolated from one another by impermeable barrier means. These barrier means are ruptured or dissolved by suitable means to trigger the foaming reaction that provides the force to deploy the reinforcing elements such that a foamed panel having suitably located reinforcing means is produced. Because the foamable means for producing the panel are self-contained and can be remotely activated, structures can be made using the panel as a foamed-in-place core and in which, also, the foaming of the panel locks the components of the structure together and, if desired, to the components of other structure such that the need for other fastening means is thereby rendered unnecessary.

CROSS-REFERENCE TO RELATED APPLICATIONS

The present application is for an improvement of the method for constructing a honeycomb structure of my copending application, Ser. No. 1,698, filed Jan. 9, 1970, now Pat. No. 3,644,158.

BACKGROUND OF THE INVENTION

This invention relates to a method for constructing reinforced foamed-panel structures and, particularly, to a method in which self-contained chemical means are used both to foam the panel and to deploy the reinforcing elements associated therewith.

Foamed panel structures are in common use in widespread applications. When such panels are used as a core element, the core is usually foamed into the structure during the manufacturing operation. Also, foam generators are available such that a core can be foamed-in-place in an already erected structure at the place of use. Reinforced foamed-panel structures are also known in the art and such can comprise a construction material such as honeycomb core reinforced with a foamed substance, such as an appropriate foamed polyurethane resin, or the panel can comprise a suitable foamed substance which is stiffened, for example, by strips of sheet material. Because of the impediment offered by the rigid stiffening or reinforcing means, it is difficult to introduce the foam into the structure after it has been assembled and it is the usual practice to foam a reinforced panel during the manufacture of the structure before, for example, the installation of face sheets and the like. Once the assembly of a structure having reinforcing means such as honeycomb or stringers in the core area is completed, it is usually difficult and sometimes impossible to introduce the foam thereinto.

SUMMARY OF THE INVENTION

To overcome the foregoing and other difficulties of the prior art, an object of this invention is to provide a method in which the reinforcing elements of a panel structure are treated during their fabrication with a stable, but potentially reactive, self-contained force-generating substance, preferably a foamable material, such that it can be shipped and otherwise handled in a convenient folded state so that the force-generating foamable material can be activated by minimal means such as, for instance, heat so that the reinforcing elements are deployed by the foam and are also embedded therein. It is a further object that the foamable material, after it has deployed the reinforcing elements, remains in place to further strengthen and insulate the structure.

It is another object of this invention to provide reinforced foamed-panel structures and a method for fabricating such structures utilizing deployable reinforcing means which employs a foamable material as a self-contained deploying and strengthening means so that structures having a reinforced, foamed-in-place core can be produced conveniently and economically. Further, the structures and panels can be designed such that the expansion of the core locks the components of the assembly and associated assemblies together and eliminates the requirement for other joining means.

DESCRIPTION OF THE DRAWINGS

For the purpose of illustrating the invention, there is shown in the drawings the forms which are presently preferred, it being understood, however, that this invention is not necessarily limited to the precise arrangements and instrumentalities here shown.

FIG. 1 is a fragmentary sectional view in perspective of panel elements in accordance with the invention assembled in panel structure;

FIGS. 2, 3, and 4 are perspective views of the panel elements of the invention;

FIG. 5 is a sectional view of the panel element of FIG. 3 taken along line 5—5;

FIG. 6 is a fragmentary sectional view in perspective of the panel structure of FIG. 1 after the panel elements have been activated to provide a reinforced foam core;

FIG. 7 is a fragmentary sectional view of the panel structure of FIG. 6 with the upper portion of the panel removed;

FIGS. 8, 9, and 10 are sectional views of further embodiments of panel elements in accordance with the invention;

FIG. 11 is a fragmentary sectional view of the panel element of the embodiment of FIG. 10 with associated structure after the activation of the panel;

FIG. 12 is a fragmentary sectional view in perspective of a further embodiment of a panel element of the invention;

FIG. 13 is a perspective view partially cut away of panel elements of the embodiment of FIG. 12 assembled in a frame for producing a panel therewith;

FIG. 14 is a fragmentary sectional view in perpsective of the embodiment of FIG. 13 after the activation of the panel;

FIG. 15 is a sectional view in perspective of a further embodiment of the panel element of the invention assembled for use as a core for a tubular structure;

FIG. 16 is a fragmentary sectional view in perspective of the embodiment of the panel element of FIG. 15 used after the activation of the panel to join a tubular structure to another;

FIG. 17 is a fragmentary sectional view in perspective of a further embodiment of a panel element of the invention;

FIG. 18 is a fragmentary view in perspective of a workpiece designed for use with the panel element embodied in FIG. 17;

FIG. 19 is a fragmentary view in perspective of a further embodiment of a panel element of the invention;

FIG. 20 is a fragmentary view in perspective of the embodiment of FIG. 19 after the activation of the panel;

FIG. 21 is a fragmentary view in perspective of a further embodiment of a panel element of the invention; and FIG. 22 is a fragmentary view in perspective of the embodiment of FIG. 21 after the activation of the panel.

DESCRIPTION OF THE PREFERRED EMBODIMENTS

Reference is now made to the drawings, and more particularly to FIG. 1, which illustrates an initial step in the fabrication of a reinforced, foamed-panel structure in which, in this embodiment of the method of the invention, the foamed-panel is used as a core in a sheet metal panel. The reinforcing elements 11 utilized in this embodiment comprise individual strips 12 of a suitable sheet material such as cardboard or metal. Strips 12 can be cut from straight stock as shown in FIG. 2 or can be provided with transverse angular corrugations 13 (strip 12a, FIG. 3). Corrugations are advantageous in that they permit the strips 12a to be free-standing during their assembly and, in addition to imparting a desirable stiffness against twist, they reduce the possibility of the strips binding when they are deployed during the foaming step. Instead of angular corrugations, undulatory and other configurations (not shown) can be used and one or more longitudinal corrugations 14 (strip 12b, FIG. 4) can be provided for added stiffness if required. One or both sides 15, 15a of the strips are furnished with a foamable substance 16 as perhaps best shown in FIG. 5.

Foamable substance 16 can be chosen from a wide selection of known materials which are suitable for use in this method. Because of their useful properties and availability, foamable urethanes resins are preferred. Because the foamable substance is applied during the fabrication of the strips 12 and it is not intended that the foaming action should be initiated until some subsequent time, the reactive constituents of the substance must be kept isolated from one another until such time as it is desired to activate the substance. As is well known in the art, isolation of the reactive components of the foamable substance can be by means of an impermeable barrier which is ruptured by known means to initiate the foaming action. In this method, it is preferred to isolate the reactive components from one another by microencapsulation techniques. Such techniques are well known and, if polyurethane foams are to be used, the teachings of U.S. Pat. No. 3,455,848, R. A. Yoncoskie et al., are particularly suitable.

As is known in the technique, the required foam-producing ingredients are intimately mixed together as substantially discrete particles. Any suitable foam-producing substance can be used, such as a polyurethane, which is preferred, or a phenolic, or the like. An important requirement for the substance used and its formulation is that the expansion forces that are generated during the foaming action must be of a magnitude great enough to deploy the reinforcing elements and the increase in volume upon foaming should be sufficient to insure full deployment of the elements. Inasmuch as up to 30 p.s.i. and an increase in volume of over 20 times the unfoamed state are produced in typical foaming reactions, the requirements are not unduly restrictive.

As stated previously, the isolation of the reactive ingredients of the foamable substance can be effected by an impermeable barrier or membrane. Any suitable material such as wax, natural polymers like gelatin, plastics, or metals can be used for the impermeable barrier. It will be appreciated that the barrier material selected should be inert to the ingredients being isolated and to the environment in which it will be used. As is well known, when it is desired to expose the ingredients to one another to initiate the foaming action, the barrier can be ruptured or penetrated by various means. These means include heat (including that produced by radio frequency heating), pressure, electromagnetic radiation (particularly infrared and ultra-violet), and suitable fluid solvents. A further known technique is to apply the foamable substance without the activator on the affected areas of the panel strips during their fabrication and then to enclose the treated strips comprising an entire panel or core in a wrapping of impermeable material such as a stripable plastic film. To initiate the foaming action, the plastic film is stripped away and the strips comprising the panel are exposed to the activator to trigger the foaming action.

In this embodiment, the core 11 is used to fabricate a panel-like sandwich structure 10 having face members 17 and 18. Face members 17 and 18 have integral peripheral edges 19 and 20 respectively. The edges are lipped over such that when they are placed over one another with the lipped edges 21 and 22 in contact they form a hollow panel structure with the lipped edges forming a rib 23 extending around the hollow interior space. Each of the lipped edges 21 and 22 has a cut-away portion 24 and 25 respectively in each of their longitudinal sides. These cut-aways are located in different longitudinal positions in each of their respective lipped edges relative to one another so that when the sides and the ends 19a, 20a of the face members are squared off in proper alignment the cut-aways are out of register. The cut-aways provide sufficient clearance to permit the core strips 12 to be inserted into position. It may be required in the interests of insuring proper venting of the reaction when the foamable substance 16 is activated to provide vents such as holes 26 or other suitable venting means in either or both face members. The strips 12 themselves can have vent holes or preferably can be slotted 27 on their upper 28 and/or lower edges 29. The size of the slots will be governed by the amount of gas produced by the foaming action, but one or more slots measuring 0.025 in. deep and 0.025 in. wide should be suitable for most foamable substances used. Each end of the core strips are notched 30 to a depth exceeding slightly the width of the rib 23 of the assembled face members.

The ingredients of the foamable substance 16 with the activator isolated from the reactants by an impermeable barrier are coated on both sides of the core strips 12 during their manufacture. The amount of foamable substance applied will be governed by the type, formulation, the expansion coefficient of the substance used, the desired density of the foam, and other factors well known in the art. In this embodiment, it is preferred to use a microencapsulated polyurethane foam-producing composition and to use a capsule wall material which is dissolved or ruptured by heat such that the nucleus material is released and the foaming reaction is initiated. Any known technique such as spraying, roller applicator, and the like, can be utilized to apply the coating 16. If a binder such as a lacquer, varnish, or resin is employed to insure the integrity of the coating, it is essential that the binder is inert to the core strips and associated structure and to the capsule material and other ingredients and that it has suitable bonding and drying characteristics. After being treated with the foamable substance, a number of the strips 12 making up a complete core 11 can be encased in an impermeable stripable plastic film (not shown) such as, for instance, "Mil Seal 34201," made by Milprint Inc., Milwaukee, Wisconsin, to thus protect it prior to its being used.

To fabricate a foamed core panel 10, face member 18 is placed with its lipped edge 22 upward and a predetermined number of core strips 12 are positioned thereon with the notches 30 in the ends of the strips engaged on edge 22. Cut-away 25 in the edge provides the necessary clearance for inserting the strips. The number of strips used in the panel will be predicated on the thickness of the coating of foamable substance 16 and the expansion coefficient and other characteristics of that substance. An adequate number of strips should be used to insure that, after activation, a body of foam of the required density fills the inside of the panel. If strips having substance 16 applied on both sides are used, untreated strips (not shown) can be sandwiched between the treated strips. With notches 30 engaged on edge 22, the strips 12 are assembled side-by-side and face member 17 is then positioned with cut-away 24 over the top of the assembled strips and is lowered into contact with face member 18 such that edges 21 and 22 are firmly seated on one another. (The strips 12 in FIG. 1 are spread apart merely for illustrative purposes.) With the edges in firm contact, face members 17 and 18 are adjusted until their sides and ends are aligned. With the face members maintained in close contact by suitable means such as sand bags (not shown), the assembly is heated by suitable means such as heat lamps (not shown) to activate the foamable substance on the strips to thus foam in place the core to thereby produce a reinforced foam-core panel 10 (FIG. 6). The rib 23 formed by lipped edges 21 and 22 is trapped in notches 30 of the strips such that the face members of the panel are positively locked together. This mechanical locking action is supplemented by the adhesive properties of the polyurethane foam such that there is also a chemical bond between the face members and the core. The foam, of course, also serves its normal function as an acoustic and thermal insulator. The expansion of the foamable substance not only produces a foam 16F but also serves to deploy the strips (FIG. 7) with the spacing thereof being governed by the applied thickness of the coating of foamable substance.

It is feasible to apply the foamable material only on selected areas of the strips and to employ different foamable substances on those selected areas of the strips and also to employ different foamable substances on portions of the strips to thereby benefit from some characteristic of the different substances. Thus, as shown in FIG. 8, core strip 12c may have a foamable substance 16a selected for some property such as its expansion characteristics deposited on the central part of the strip and a substance 16b selected, for instance, for its adhesive properties applied on the edge portions. Substance 16b can be formulated such that it has a "delayed action" so that its activation is not initiated until after substance 16a is activated. Alternately, substance 16b may be such that it produces a closed-cell foam selected for its insulation properties, and substance 16a may produce an open-cell foam that is useful for ventilation purposes or for the circulation of a fluid therethrough to serve other functions. Foamable substances having different characteristics can be applied one on top of the other such that a foamable substance of an open-celled type, for instance, is applied directly on the surfaces of the core strip and a foamable substance of a closed-cell type is applied thereupon to obtain some desired combination of properties.

Instead of applying the foamable substance directly on the strip 12, it can be coated on paper or other sheet material and the treated paper can be fixed as by an adhesive on the strip or other element to be foamed and deployed. As shown in FIG. 9, the foamable substance 16c is coated on a sheet of suitable material, such as cardboard or paper 31, having on its other side an adhesive 32, preferably of the well-known pressure-sensitive type, by which it is fastened on a workpiece 33.

Alternately, the adhesive can be applied on the surface of the foamable substance rather than on the back of a sheet material. The foamable substance 16d thus would be applied to a sheet, or other configuration, of material such as metal sheet 34 and a suitable adhesive 32a would then be applied to the face 35 of the foamable substance (FIG. 10). In use, the treated sheet 34 is fixed by means of the adhesive 32a to a workpiece such as to the face of a panel 36. When the substance 16d is activated to cause it to foam, a core structure 37 having foam 16dF sandwiched between the sheet of material 34 and panel 36 is produced (FIG. 11).

In the above described embodiments, the foaming action of a foamable substance is used to deploy bodily in translation strips of reinforcing material. In further embodiments of the reinforced foam-panel structures of the invention, the foamable substance is applied to sheet material having flaps or folding portions such that the flaps are deployed out of the folded state by the reaction forces of the substance when it is foamed to form upright reinforcing elements therein.

In one such embodiment shown in FIG. 12, a core strip 112 has a longitudinal body 113 having flap portions 114 and 115 which are hinged appropriately 117 along both sides 118 and 119 of the body for pivotal movement therewith. Hinges 117 may be longitudinal scorings 120 or other design expedients can be employed to promote ease of pivoting. The inside surfaces 121 of the body and, if desired, the inside surfaces 122 of the flaps are coated with a foamable substance 116, which may be similar to those of the previous embodiments. A "U"-section frame 123 having side pieces 124 and end pieces 125 with integral flanges 126 and 127 is provided to contain the core.

In operation, to construct a panel structure using the core elements of this embodiment, a predetermined number of core strips 112 are positioned in the inside channel of the frame 123 at one end thereof with the flap side of the strips orientated to face the channel at the end of the frame (FIG. 13). After the strips are properly positioned, the assembly is heated by suitable means such as heat lamps (not shown) to activate the foamable substance 116. Upon activation, the foaming deploys the strip flaps causing them to pivot about the hinge portions as indicated by directional arrows 128 into the flap extended position 129 as indicated by broken lines in FIG. 12. In the extended position, the flaps 114 and 115 of the deployed core strips serve as face sheets to thus form with the frame 123 a panel structure 130 having a foamed core 116F as indicated in FIG. 14. It will be appreciated that this embodiment can serve, for example, as an effective fire door whereby the foamable substance 116 is activated by excessive heat to thus deploy the strips and thereby close off the door opening.

A further embodiment in which the forces generated by the foaming of a foamable substance are used to deploy flap members is shown in FIG. 15. As illustrated, the core strip 212 has a longitudinal body 213 having flap portions 214 and 215 which are hinged 217 appropriately along both sides 218 and 219 of the body for pivotal movement therewith. Hinges 217 may be longitudinal scoring 220 or other suitable means. The facing surfaces 221 and, if desired, 222 of the flaps are coated with a foamable substance 216. Appropriate venting means such as notches 223 in the edges of the flaps can be provided as required. In this embodiment the core 212 can be used to strengthen a cylindrical structure 224.

In operation, to foam a reinforced core in cylinder 224, core strip 212 is positioned in the bore of the cylinder and the assembly is heated by suitable means (not shown) to activate the foamable substance 216. Upon activation, the foaming deploys the strip flaps causing them to pivot about the hinges 217 as indicated by arrows 225 into the flap extended position as shown in FIG. 16 such that the flaps serve to stiffen the foamed core 216F. In addition to forming a core in a single structure, core strip 212, if positioned between two structures such as cylinders 224 and 224a of FIG. 16, when foamed will act as a splice plate tying the two cylinders together as well as serving to strengthen them.

In this invention, the foam used in the core has advantageous bonding properties. It is thus feasible to use a core strip that can be designed to be separable into several pieces to permit their insertion into a hollow workpiece through an opening too small to admit a one-piece core strip and to subsequently activate the core such that the foam bonds the several pieces to one another and to the workpiece. An embodiment of such a design is illustrated in FIG. 17. In this embodiment, a core sheet 312 has a body comprising two segments 313a and 313b having flap portions 314a and 314b respectively on one side and flap portions 315a and 315b respectively on their other side. With the exception of the two-piece body, this embodiment is similar in all essential respects with obvious exceptions to the construction of FIG. 15 and it is not believed that it would serve any useful purpose, therefore, to give a detailed description.

In operation, the body segments 313a and 313b are inserted one at a time through the opening 322 into the workpiece 323 (FIG. 18). After the segments are aligned properly in the workpiece, the assembly is heated by suitable means (not shown) such that the flap portions are deployed by the foam to serve to stiffen the resulting foamed core.

A further embodiment in which the core strip is provided with longitudinal stiffening elements as well as transverse stiffeners is shown in FIG. 19. As shown, a core sheet 412 has a body member 413 having transverse flaps 414 and longitudinal flaps 415 hinged at 417 and 417a respectively as required for pivotal movement with respect to the body member. Hinges 417 and 417a can be fabricated of a flexible sheet material and the ends 418 and 419 thereof of each hinge can be bonded respectively to the body member and the flap. The surfaces 421 and 422 of the flaps are coated as required with a foamable substance 416. To permit their erection, flaps 414 and 415 are provided with cut-away portions 423 and 424 each having a curved ramp portion 425 and a straight stop 426 portion. Although shown only on one side of core sheet 412, flaps similar to 414 and 415 can be provided on the other side as well.

In operation, to foam a reinforced core in a panel or other structure (not shown), core sheet 412 is positioned suitably in the panel and the assembly is heated by suitable means (not shown) to activate the foamable substance 416. Upon activation, the foaming deploys the flaps causing them to pivot about hinges 417 and 417a as indicated by directional arrows 427 and 428 into the flap erected position shown in FIG. 20. When the flaps pivot into the erect position, the ramp portion of the cut-away portion 423 of one flap will ride up the ramp portion of the cut-away portion 424 of the other flap until the stop portions 426 come into contact and thereby limit the travel of the flaps. As indicated in outline 429, the foam 416F will fill the areas between the flaps and the structure being stiffened and insulated.

It will be appreciated that deployable reinforcing elements can have other configurations than the ones shown. As shown in FIG. 21, for example, the panel element can be deployable in two different planes such that it is erected in a fashion similar to a paper Chinese lantern. Thus, the core can comprise sheets or strips 512 pivotally attached in any suitable manner to a tubular spine member 513 which can be provided with vent openings 514 at the hinge points 515 of the strips 512 such that gases produced by the subsequent foaming action can pass into the spine and be vented out of the open end 517 thereof. Transverse webs 518 having their end portions 519 bonded 520 to the strips serve as transverse reinforcing members for the core when deployed. Appropriate areas of the webs and strips are coated in accordance with the invention with a suitable foamable material (not shown). In operation, the assembly is heated by suitable means (not shown) such that the foam (not shown) deploys the strips and webs into the erected or unfolded configuration (FIG. 22).

In the specification, the terms "foamed panel" and "foamed core" have been used almost interchangeably as it will be appreciated that a panel can be foamed in place in enclosing structure or a panel can be foamed without being part of enclosing structure and the panel so made can be inserted or assembled into structure to reinforce and insulate it. However, if the foam has the required characteristics, the reinforcing panels of various embodiments of the invention can be used without face sheets or other surrounding structure. It is also understood that a foamable substance can be coated on other portions of the structure as well as on the core strips and flaps.

Although shown and described in what are believed to be the most practical and preferred embodiments, it is apparent that departures therefrom will suggest themselves to those skilled in the art and may be made without departing from the spirit and scope of the invention. I, therefore, do not wish to restrict myself to the particular details illustrated and described, but desire to avail myself of all modifications that may fall within the scope of the appended claims.

Having thus described my invention, what I claim is:

1. The method of using the forces developed during the foaming of a foamable substance to deploy structural elements associated therewith to produce a structurally reinforced foamed panel, comprising the steps of:

providing at least one core strip element which is physically independent with respect to associated structure and which is movable in translation out of a first position into a second position;

applying on selected areas of said core strip element during the fabrication thereof at least one of the reactable ingredients of said foamable substance such that said areas will experience a force from said substance when it foams; and exposing said foamable substance to an activator to initiate the foaming thereof whereby the forces generated by the foaming action deploy said core strip element in translation out of said first position into said second position.

2. The method of claim 1 wherein the core strip element is associated with adjacent structure such that after foaming the foamed panel which is reinforced with said core strip element serves to reinforce said adjacent associated structure.

3. The method of claim 1 wherein the core strip element is associated with a first and at least a second adjacent structure such that after foaming the foamed panel which is reinforced with said core strip element serves to reinforce and join at least said first and second adjacent associated structures to one another.

4. The method of claim 1 wherein the foamable substance has adhesive properties such that it bonds to structure which it contacts upon foaming.

5. The method of using the forces developed during the foaming of a foamable substance to deploy structural elements associated therewith to produce a structurally reinforced foamed panel, comprising the steps of:

providing a panel element having at least a segmented portion which is pivotally associated therewith, said portion being movable out of a first position into a second position;

applying on selected areas of said panel element during the fabrication thereof at least one of the reactable ingredients of said foamable substance; such that those areas will experience a force from said substance when it foams; and exposing said foamable substance to an activator to initiate the foaming thereof whereby the forces generated by the foaming action deploy said segmented portion by pivoting it out of said first position into said second position.

6. The method of claim 5 wherein the panel element is associated with adjacent structure such that after foaming the foamed panel which is reinforced with said panel element serves to reinforce said adjacent associated structure.

7. The method of claim 5 wherein the panel element is associated with a first and at least a second adjacent structure such that after foaming the foamed panel which is reinforced with said panel element serves to reinforce and join at least said first and second adjacent associated structures to one another.

8. The method of claim 5 wherein the foamable substance has adhesive properties such that it bonds to structure which it contacts upon foaming.

References Cited

UNITED STATES PATENTS

| | | | |
|---|---|---|---|
| 2,744,042 | 5/1956 | Pace | 156—197 |
| 2,891,288 | 6/1959 | Daley | 156—79 |
| 3,106,503 | 10/1963 | Randall | 156—197 |
| 3,264,153 | 8/1966 | Rodman et al. | 156—79 |
| 3,294,602 | 12/1966 | Francis et al. | 156—79 |
| 3,365,353 | 1/1968 | Witman | 156—79 |
| 3,466,220 | 9/1969 | Allinikov et al. | 156—197 |
| 3,614,848 | 10/1971 | Hitch | 156—79 |
| 3,615,974 | 10/1971 | Graff | 156—197 |
| 3,644,158 | 2/1972 | Strumbos | 156—197 |

GEORGE F. LESMES, Primary Examiner

E. P. ROBINSON, Assistant Examiner

U.S. Cl. X.R.

156—77, 78, 197; 161—69; 264—45, 55